(12) United States Patent
Pandey et al.

(10) Patent No.: US 7,706,337 B2
(45) Date of Patent: Apr. 27, 2010

(54) METHOD FOR PERFORMING NEIGHBOR DISCOVERY IN A MULTI-TIER WLAN

(75) Inventors: Aparna Pandey, Chicago, IL (US); Randy L. Ekl, Lake Zurich, IL (US); Christopher G. Ware, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 1229 days.

(21) Appl. No.: 10/970,940

(22) Filed: Oct. 22, 2004

(65) Prior Publication Data

US 2006/0089964 A1 Apr. 27, 2006

(51) Int. Cl.
*H04Q 7/24* (2006.01)

(52) U.S. Cl. ........................ 370/338; 370/337; 370/347; 370/328; 370/349

(58) Field of Classification Search .................. 370/337, 370/338, 347, 328, 349
See application file for complete search history.

(56) References Cited

U.S. PATENT DOCUMENTS

| | | | | |
|---|---|---|---|---|
| 6,980,810 | B1 * | 12/2005 | Gerakoulis et al. | 455/450 |
| 7,184,421 | B1 * | 2/2007 | Liu et al. | 370/338 |
| 2002/0075940 | A1 * | 6/2002 | Haartsen | 375/132 |
| 2002/0114303 | A1 | 8/2002 | Crosbie et al. | |
| 2004/0121749 | A1 * | 6/2004 | Cui et al. | 455/226.1 |
| 2004/0121774 | A1 * | 6/2004 | Rajkotia et al. | 455/441 |
| 2004/0185782 | A1 | 9/2004 | Halford et al. | |
| 2004/0228311 | A1 | 11/2004 | Sugaya et al. | |
| 2004/0233936 | A1 | 11/2004 | Cheng | |
| 2005/0009565 | A1 | 1/2005 | Kwak | |
| 2005/0047383 | A1 | 3/2005 | Yoshida | |
| 2005/0053043 | A1 * | 3/2005 | Rudolf et al. | 370/337 |
| 2005/0058117 | A1 | 3/2005 | Morioka | |
| 2005/0128988 | A1 | 6/2005 | Simpson et al. | |
| 2005/0192037 | A1 * | 9/2005 | Nanda et al. | 455/509 |
| 2005/0221838 | A1 | 10/2005 | Cha et al. | |
| 2005/0282546 | A1 * | 12/2005 | Chang et al. | 455/436 |
| 2006/0009246 | A1 | 1/2006 | Marinier et al. | |

(Continued)

FOREIGN PATENT DOCUMENTS

KR 1020040085719 10/2004

OTHER PUBLICATIONS

PCT Search Report Dated Jun. 21, 2006.

(Continued)

*Primary Examiner*—Patrick N Edouard
*Assistant Examiner*—Julio R Perez
(74) *Attorney, Agent, or Firm*—Indira Saladi; Randi L. Karpinia; Anthony P. Curtis (57) ABSTRACT

A method for performing neighbor discovery in a multi-tier wireless local area network where a client creates a neighbor list identifying a neighbor wherein the neighbor is identified as an access point or a client. Then, the client determines a time to perform a scan of neighbors based upon 1) a type of neighbor discovery to be performed and 2) when a first beacon is transmitted by an access point in a first tier of the multi-tier wireless local area network. Subsequently, the client performs a scan of neighbors at the determined time on a channel associated with the type of neighbor discovery. Finally, the client receives a beacon sent from a neighbor of the client to update the neighbor list with information transmitted in the beacon.

27 Claims, 4 Drawing Sheets

U.S. PATENT DOCUMENTS

2006/0274792 A1 12/2006 Abhishek et al.
2007/0191016 A1* 8/2007 Beasley et al. .............. 455/442

OTHER PUBLICATIONS

PCT/US05/35846—EPC International Search Report for U.S. Appl. No. 10/971,293—Mailed Mar. 21, 2006—pp. 1-8.

KIPO Notice of Preliminary Rejection (English Translation) for U.S. Appl. No. 10/971,293—Dated Dec. 29, 2008.

H. Y. Kwon et al., "Technical Trends on Mobile Ad-Hoc Networks," (English Translation) Analysis of Electronic Communication Trends, vol. 18, No. 2, Apr. 2003, pp. 11-24.

USA Office Action Dated Jun. 19, 2007 for U.S. Appl. No. 10/971,293.

USA Office Action Dated Nov. 16, 2007 for U.S. Appl. No. 10/971,293.

USA Office Action Dated Jun. 2, 2008 for U.S. Appl. No. 10/971,293.

* cited by examiner

METHOD FOR PERFORMING NEIGHBOR DISCOVERY IN A MULTI-TIER WLAN

REFERENCE TO RELATED APPLICATIONS

The present application is related to the following U.S. application commonly owned together with this application by Motorola, Inc.: Ser. No. 10/970,940 filed Oct. 22, 2004, titled "Method for Propagating Beacons in a Multi-tier WLAN" by Pandey et al.

FIELD OF THE INVENTION

The present invention relates generally to wireless communication systems and in particular to the field of neighbor discovery in wireless local area networks.

BACKGROUND OF THE INVENTION

Neighbor discovery is a process used by clients to discover neighboring clients and access points (APs) in a wireless local area network (WLAN). In a WLAN, typically the clients are endpoints of a communication path, and the APs are typically stationary and the intermediaries by which a communication path to a client may be established or maintained. It is generally desirable in a WLAN to have rapid establishment of communication links between clients and APs, and to have rapid handoff between APs, without errors and without inadvertently dropping the communication. This type of capability is generally accommodated by allowing the client to scan various channels where scan means to go from listening to a serving AP on one channel to listening to a neighboring AP on another channel. This allows the client to determine which AP or client to hand off to when the need to handoff occurs.

In general, IEEE 802.11 outlines two scanning methodologies to perform neighbor discovery. One is termed active scan and requires that clients broadcast a probe request packet which is heard by neighbors. Neighboring APs of the client respond by sending a probe response packet. Even though active scan allows a client to discover neighboring APs, active scan does not allow a client to determine neighboring clients, since clients do not send probe response packets. Thus, with active scan neighboring clients are hidden and not revealed during the process of neighbor discovery. Further, if a client constantly sends probe request packets because it has not received any probe response packets, and there are neighboring clients that are hidden from the client, then the superfluous probe request packets may cause unnecessary collisions or waste capacity in the wireless local area network.

The other scanning methodology is termed passive scan and requires a client to listen on a specific channel and determine its neighbors by decoding the packet transmissions on the channel. Even though passive scan allows a client to discover neighboring clients and APs, passive scan requires a client to spend much time listening to a channel. Spending an extended period of time listening to a channel may be a problem for clients which are small and have limited power and storage capabilities. Further, if neighboring clients are not sending packet transmissions, then a client that listens to a specific channel may not be able to determine neighboring clients. Thus, even with passive scan, neighboring clients may be hidden from the client. Further, scanning for long periods of time causes the clients to consume unnecessary power and strains the clients' limited storage capabilities.

The prior art methods of discovering neighbors has many limitations. Among them are that neighboring clients are not always revealed, unnecessary collisions are caused, capacity is wasted, and the amount of power of clients may be drained. Accordingly, there exists a need for an improved method of neighbor discovery in a wireless local area network.

BRIEF DESCRIPTION OF THE FIGURES

A preferred embodiment of the invention is now described, by way of example only, with reference to the accompanying figures in which.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION

Figure 1:
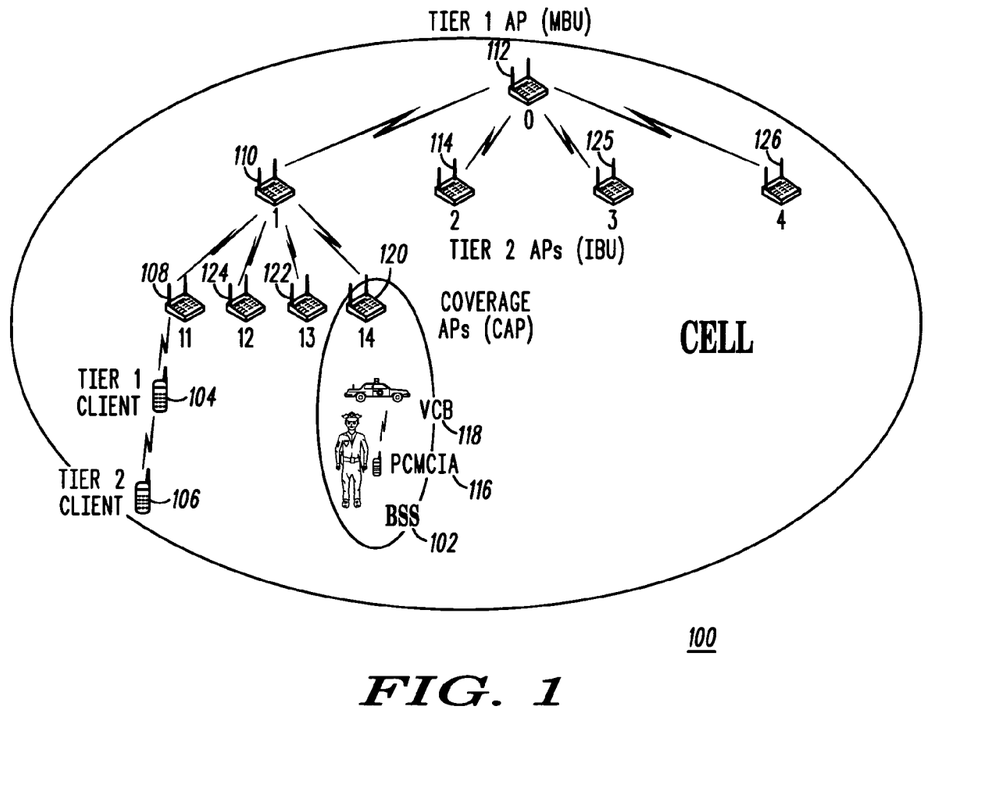
FIG. 1 is an example block diagram illustrating a typical wireless local area network system in accordance with an embodiment of the invention.

An embodiment of the present invention is described with reference to FIG. 1. Shown in FIG.1 is a multi-tier wireless local area network (WLAN) 100. The invention may be thought of as a multi-tier WLAN and/or be embodied in a multi-tier WLAN. The WLAN is termed multi-tier to specify that there are multiple tiers of nodes, e.g. multiple tiers of access points (APs) and/or multiple tiers of clients, where a node is a well known term in the art and means a client or an access point. On the AP side of the multi-tier WLAN communications hierarchy, a single AP 112 communicates with APs in a second tier 110, 114, 125, 126. In an exemplary embodiment, the tier 1 AP 112 is termed a master backhaul unit (MBU) and provides communications to a wired network (not shown). As shown in FIG. 1, the second tier APs 110, 114, 125, 126 communicate with coverage APs and are termed intermediate backhaul units (IBUs). Although only two tiers of APs are shown in FIG. 1, many more tiers of APs may exist and are considered to be obvious extensions of FIG. 1. For example, a multi-tier WLAN may comprise tier 1, tier 2, tier 3, and tier 4 APs. In any case, the coverage APs communicate with the clients of the multi-tier WLAN where the clients may also be tiered.

The distinction between coverage APs and tiered APs, e.g. tier 1 AP or tier 2 AP, is that a coverage AP interfaces with the clients of the multi-tier WLAN and the tiered APs are the intermediaries of a communication between the clients in the multi-tier WLAN. In an alternate embodiment, the functionality provided by a tiered AP may be combined into a coverage AP, and vice versa, so one AP, whether tiered or coverage, may provide both functions.

On the client side of the multi-tier WLAN communications hierarchy, a tier 1 client communicates directly with a single coverage AP to provide access to the wired network (not shown) or to the rest of the wireless multi-tier WLAN communications hierarchy. In a second tier, a tier 2 client communicates with a tier 1 client to access a coverage AP. The tier that a client is a part of specifies the number of hops that the client is away from a coverage AP. For example, a tier 2 client is two hops away from a coverage AP. Although only two tiers of clients are shown in FIG. 1, many more tiers of clients may exist. In any case, the clients of the multi-tier WLAN communicate with the coverage APs of the multi-tier WLAN. Further, a single coverage AP and all the clients associated with the coverage AP is termed a basic service set (BSS), e.g. BSS 102 in FIG. 1. As used herein, the coverage AP that a client is associated with is termed a serving coverage AP.

Even though both a tier of APs and a tier of clients are shown in FIG. 1, an embodiment of the present invention is contemplated to work in other environments where either the tier of APs or the tier of clients is missing in the multi-tier WLAN. For example, an embodiment of the present invention is contemplated to work in an ad-hoc network where only clients exist where the clients form a temporary network without the aid of any centralized administration or standard support services. Another example, an embodiment of the present invention is contemplated to work in a network where only APs exist where the APs form the backhaul of the network.

As will be appreciated by those of skill in the art, the clients may be any suitable type of wireless communications device capable of communicating within an ad-hoc network, such as computers, personal data assistants (PDAs), fixed mounted devices, vehicular mounted devices, or handheld devices, as well as others. Certain of the clients may also be connected to a fixed communications infrastructure, if desired.

According to an embodiment of the invention, each client has a neighbor list that comprises information about each neighbor that the client is within hearing range of where hearing is defined as the ability to communicate with the client. The neighbor list includes information such as MAC address, channel number, number of hops to a coverage AP, and a type that the neighbor is where the type is an identifier such as whether the neighbor is a client or an AP. Alternatively, the neighbor list may also include information such as signal strength.

The process of populating the neighbor list is performed by a number of network protocols, such as beacon transmissions (also termed "beacons"), distance vector routing, and other similar protocols, and is beyond the scope of this disclosure. An embodiment of the present invention is described with reference to beacons as used in passive scanning. As used herein, passive scanning is defined as locking onto a specific frequency to intercept beacons. In general, beacons are defined as packets transmitted by an AP, whether tiered or coverage, and/or clients in the multi-tier WLAN that has information about the multi-tier WLAN such as timing synchronization, traffic queues, and the capabilities of the sender, e.g. the AP.

Figure 3:
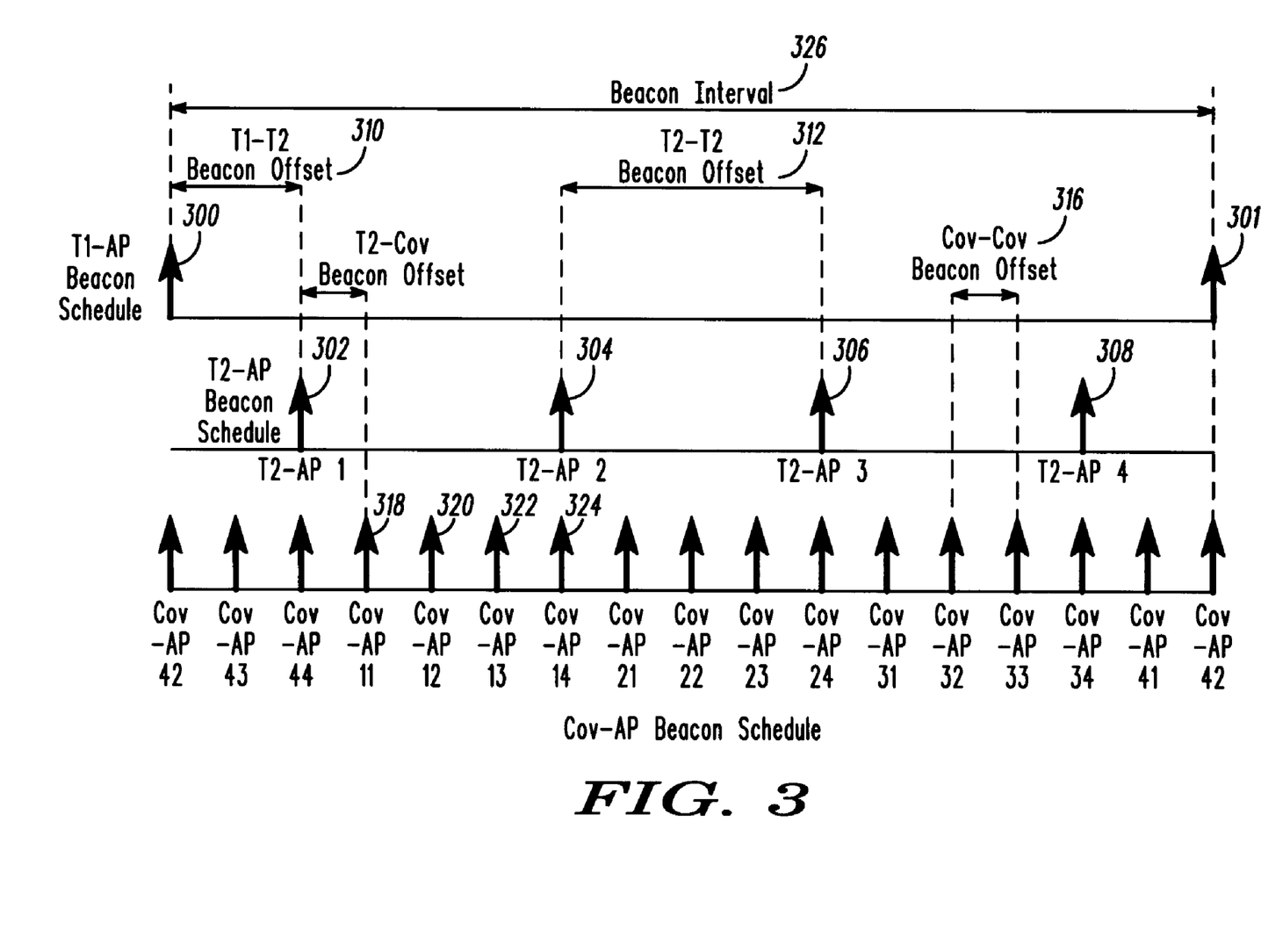
FIG. 3 is a timing diagram illustrating a beacon propagation schedule in accordance with an embodiment of the invention.

In such an embodiment and as known in the IEEE 802.11 art, beacons transmitted by an AP are transmitted once every beacon interval where a beacon interval is defined as the time between consecutive beacons transmitted by a tier 1 AP, e.g. 300, 301 as shown in FIG. 3. Beacons transmitted by a single AP have a fixed frequency but may or may not be the same frequency with which beacons are transmitted by a different AP. For example, in FIG. 1, tier 1 AP 112 transmits beacons at one rate and tier 2 AP 110 may transmit beacons at a different rate. Further, beacons transmitted by tier 2 AP 114 may be transmitted at yet a different rate. Beacons are transmitted across the multiple tiers of APs and multiple tiers of clients using a beacon propagation schedule, as will be explained later with reference to FIGS. 3 and 4.

Further, in such an embodiment, the clients in the multi-tier WLAN 100 also transmit beacons similar to the beacons transmitted by an AP. Such beacons are transmitted during a beacon propagation period that is a pre-designated time corresponding to either a controlled access period (CAP) or a contention period (CP) which immediately follows a serving coverage AP's beacon. In an exemplary embodiment, the beacons from the clients are transmitted during the CAP and the packets are termed beacon CAPs. Preferably, the beacon propagation period is a protected time where protected means that traffic other than beacons shall not be transmitted during the beacon propagation period.

Even though this description makes a distinction between beacons sent from APs and beacons sent from clients, in practice, these beacons may adhere to the same protocol and contain the same parameters. For example, both beacons from APs and beacons from clients have information about the multi-tier WLAN 100 including timing synchronization and traffic queues. Thus, as used herein, the term "beacon" encompasses beacons sent from an AP and beacons sent from a client. Further, beacons transmitted by clients may contain additional information including the number of hops to a serving coverage AP, a BSS identification, and a client identification, e.g. a MAC address of the client. Before an embodiment of this invention, a beacon having this additional information was not known.

In embodiments of the present invention, the frequency with which beacons are transmitted by clients in the multi-tier WLAN may be variable based on a number of factors including the number of hops to a serving coverage AP and if one or more higher tier neighboring clients are supported. In one embodiment, the clients may transmit beacons less frequently than the APs may transmit beacons and the lower tier clients may transmit beacons more frequently than higher tier clients. For example, a lower tier client, such as client 104, which supports higher tier clients, such as client 106, may transmit beacons more frequently than other clients in the multi-tier WLAN 100. Since the clients at a higher tier are further away from the serving coverage AP, than a client at a lower tier is supporting the higher tier client and all the traffic between serving coverage AP and the higher tier client is transmitted via the lower tier client.

Figure 2:
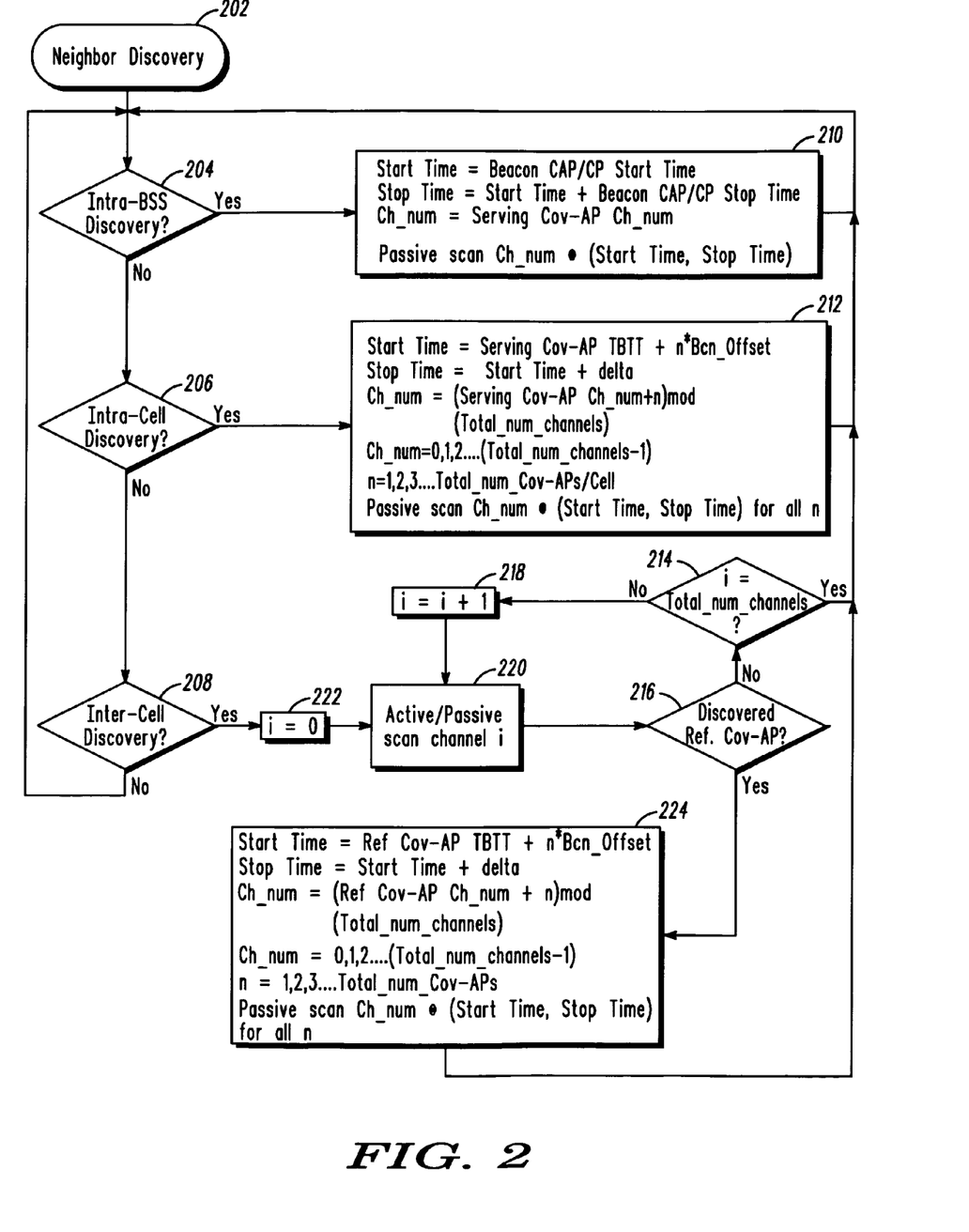
FIG. 2 is a flow diagram illustrating a method for neighbor discovery in accordance with an embodiment of the invention.

The process of discovering neighbors will be described further below. A method of performing neighbor discovery in the multi-tier WLAN 100 according to the invention will now be described with reference to the flow diagram of FIG. 2. By way of example, FIG. 2 illustrates the process of a client discovering who neighboring clients and APs are.

Beginning in Block 202 is the process of neighbor discovery. Neighbor discovery may be initiated reactively or proactively. Reactive neighbor discovery occurs when a certain condition has been triggered, such as when the serving coverage AP's signal strength to a client goes below a threshold. For example, if client 118's signal strength to AP 14 120 is below a predetermined threshold, the process of neighbor discovery as outlined in FIG. 2 may be triggered. Proactive neighbor discovery occurs at preset intervals, such as every 10 seconds. In any case, whether reactive or proactive, the product of neighbor discovery is to maintain an up to date neighbor list so that when a client needs to switch from its current coverage AP to another coverage AP or to another client which provides access to a coverage AP, the client is able to make that switch seamlessly.

Once the client determines that it needs to perform neighbor discovery (Block 202), the client can perform three different types of neighbor discovery, e.g. intra-BSS, intra-cell, and inter-cell discovery. Intra-BSS discovery is a process where a client looks for other clients associated with the coverage AP of the BSS, e.g. BSS 102. Intra-cell discovery is a process where a client looks for other clients and coverage APs associated with the same tier 1 AP as its own serving coverage AP. Inter-cell discovery is a process where a client looks for other clients and coverage APs of neighboring cells.

The decision whether to perform intra-BSS, intra-cell or inter-cell discovery may be based upon a number of factors including a signal strength to an access point, how long ago that type of discovery was performed, where the client is currently located, and the client's velocity and direction of motion. For example, client 118 moving within its BSS 102 may perform intra-BSS discovery to stay connected with coverage AP 14 120 either directly or through another client. Another example, a client moving near the edges of its BSS may perform intra-cell discovery to be able to handoff to another coverage AP when communication with the client's current coverage AP deteriorates. Yet another example, a client moving near the edges of its cell may perform inter-cell discovery to be able to handoff to a client and/or coverage AP in another cell when communication with the client's current coverage AP deteriorates.

Returning to FIG. 2, Blocks 204, 206, and 208 are decision points that trigger a specific type of discovery, e.g. intra-BSS, intra-cell, and inter-cell as outlined in corresponding Blocks 210, 212, and 224. Even though the flow chart shows the Blocks 204, 206, and 208 as sequential, in practice, the specific type of discovery as outlined in corresponding Blocks 204, 206, and 208 may be interleaved and do not necessarily have to be performed in sequential order. There may be overlap in when the specific type of discovery is performed.

In Block 204, a client determines whether to perform intra-BSS discovery. If the multi-tier WLAN implements proactive scanning, then the decision to perform intra-BSS discovery is based upon a timing structure and Block 204 questions whether it is time to perform intra-BSS discovery. If the multi-tier WLAN implements reactive scanning, then the decision to perform intra-BSS discovery may be based upon an external factor such as if the signal strength to a coverage AP has gone down. In any case, if the decision to perform intra-BSS discovery is yes, then control moves to Block 210.

As shown in Block 210, a client starts intra-BSS discovery at a time which is determined by receiving a beacon from the client's serving coverage AP. The time that the client's serving coverage AP sends its beacon is known to the client and the process for informing the client of the time that the client's serving coverage AP sends its beacon is a part of the IEEE 802.11 standard. In an illustrative embodiment of the present invention, the beacon from the client's serving coverage AP comprises an information field which tells the client when the beacon propagation period is available for it and other clients in the BSS. Knowing the beacon propagation period gives the client an indication of when a beacon is likely to be transmitted by the other clients in the client's serving coverage AP, e.g. the BSS. Before an embodiment of this invention, a beacon indicating the beacon propagation period was not known. In an illustrative embodiment, the beacon propagation period immediately follows the time that a beacon is received from the client's serving coverage AP. Other embodiments may be implemented where the beacon propagation period follows the time that a beacon is received from the client's serving coverage AP after a delay.

The client stops intra-BSS discovery after scanning for the length of time of the beacon propagation period. During intra-BSS discovery, the client locks onto the channel of the serving coverage AP, and listens for beacons from other clients in the BSS. Further, in an exemplary embodiment, the coverage AP and all its associated clients in the BSS are on one channel and they communicate with each other on that channel. In alternative embodiments, if the BSS were served by more than one channel, then intra-BSS discovery would allow for clients to scan all the channels associated with the BSS.

In an embodiment of the present invention, performing intra-BSS discovery is advantageous because it reveals neighboring clients in an efficient manner by taking advantage of the beacon propagation period. A client performing intra-BSS discovery does not have to spend much time finding the correct channel to scan or the expected beacon arrival time and thus does not have to spend much time in finding its neighbors. Thus, the client is able to save power, neighboring clients are revealed, and unnecessary collisions not caused.

As shown in Block 212, a client starts intra-cell discovery at a time which is determined by receiving a beacon from the client's serving coverage AP and at offsets from that time. When a client can expect to receive a beacon from the client's serving coverage AP is best described with reference to FIG. 3.

Shown in FIG. 3 is a beacon propagation schedule where beacons are sent at offsets from when a beacon is sent from a tier 1 AP. Assume that a beacon is sent from a tier 1 AP at a target beacon transmission time ($TBTT_i$) which is shown as beacons 300, 301 in FIG. 3. Using the $TBTT_i$ for the tier 1 AP as a reference, the times that tier 2 APs transmit beacons, namely $TBTT_{i,j}$, can be described using the following formula.

$$TBTT_{i,j} = TBTT_i + BCN\_OFST_{T1,T2} + (j-1)*BCN\_OFST_{T1,T2} \quad (1)$$

where, i=1, 2, ..., the number of tier 1 APs in the multi-tier WLAN;

j=1, 2, ..., the number of tier 2 APs in the multi-tier WLAN

In a preferred embodiment, there is only one tier 1 AP in the WLAN and the value of i is set to be an identifier of the tier 1 AP. Also, the value of "j" in known to each tier 2 AP either implicitly or via explicit signaling from the tier 1 AP. In one embodiment, the value of "j" may also determine the channel number of a specific tier 2 AP.

Further, $BCN\_OFST_{T1,T2}$ is a predesignated number chosen to allow all the tier 2 APs associated with the tier 1 AP time to receive the beacon from the tier 1 AP and is shown as time 310 in FIG. 3. The value of $BCN\_OFST_{T1,T2}$ is known to all the tier 2 APs. In one embodiment, the value of $BCN\_OFST_{T1,T2}$ is communicated in the beacon or other signaling means sent by the tier 1 AP. In an illustrative embodiment, $BCN\_OFST_{T1,T2}$ is set to be the time between two consecutive beacons sent by the same tier 1 AP divided by the number of tier 2 APs and is shown as time 312 in FIG. 3. Further, $BCN\_OFST_{T1,T2}$, is known to the tier 2 APs either implicitly or explicitly. For example, in one embodiment, the value of $BCN\_OFST_{T1,T2}$ is communicated in a beacon or other signaling means sent by the tier 1 AP. In another embodiment, the total number of tier 2 APs in the cell is communicated in a beacon or other signaling means sent by the tier 1 AP.

From Equation 1, it can be calculated that beacons are sent from one tier 2 APs at times 302, 304, 306, and 308, as shown in FIG. 3. For example, for beacon 302, the TBTT is $TBTT_{1,1} = TBTT_1 + BCN\_OFST_{T1,T2}$. For beacon 304, the TBTT is $TBTT_{1,2} = TBTT_1 + BCN\_OFST_{T1,T2} + BCN\_OFST_{T1,T2}$. For beacon 306, the TBTT is $TBTT_{1,3} = TBTT_1 + BCN\_OFST_{T1,T2} + 2BCN\_OFST_{T2,T2}$. For beacon 308, the TBTT is $TBTT_{1,3} = TBTT_1 + BCN\_OFST_{T1,T2} + 3BCN\_OFST_{T2,T2}$.

Using the $TBTT_{i,j}$ for the tier 2 APs as a reference, the time that coverage APs transmit beacons, namely $TBTT_{i,j,k}$, can be described using the following formula.

$$TBTT_{i,j,k} = TBTT_{i,j} + BCN\_OFST_{T2,Cov} + (k-1)*BCN\_OFST_{Cov,Cov} \quad (2)$$

where, i=1, 2, ..., the number of tier 1 APs in the multi-tier WLAN;
j=1, 2, ..., the number of tier 2 APs in the multi-tier WLAN;
k=1, 2, ..., the number of coverage APs in the multi-tier WLAN.

As mentioned above, in a preferred embodiment, there is only one tier 1 AP in the multi-tier WLAN and the value of i is set to be an identifier of the tier 1 AP. Further, j is set to be an identifier of the tier 2 AP associated with the coverage AP. Also, the value of "k" is known to each coverage AP either implicitly or via explicit signaling from the tier 2 AP. In one embodiment, the value of "k" shall determine the channel number of a specific coverage AP.

Further, $BCN\_OFST_{T2,Cov}$ is a predesignated number chosen to allow all the coverage APs ample time to receive the beacon from their respective tier 2 APs and is shown as time 314 in FIG. 3. The value of $BCN\_OFST_{T2,Cov}$ is known to all the coverage APs in the multi-tier WLAN. In one embodiment, the value of $BCN\_OFST_{T2,Cov}$ is communicated in the beacon or other signaling means sent by the tier 2 AP. In an illustrative embodiment, $BCN\_OFST_{Cov,Cov}$ may be set to be the time between two beacons sent by the same tier 1 AP divided by the number of coverage APs in a given cell and is shown as time 316 in FIG. 3. Further, $BCN\_OFST_{Cov,Cov}$ is known to the tier 2 APs either implicitly or explicitly. For example, in one embodiment, the value of $BCN\_OFST_{Cov,Cov}$ is communicated in a beacon or other signaling means sent by the tier 2 AP. In another embodiment, the total number of coverage APs in the cell is communicated in a beacon or other signaling means sent by the tier 2 AP.

From Equation 2, it can be calculated that beacons are sent from coverage APs associated with a single tier 2 AP at times 318, 320, 322, 324, as shown in FIG. 3. Each of the times 318, 320, 322, 324 are calculated as an offset from the time that a beacon is sent from the tier 2 AP, e.g. $TBTT_{1,1}$ at time 302. For example, for beacon 318, the TBTT is $TBTT_{1,1,1} = TBTT_{1,1} + BCN\_OFST_{T2,Cov}$. For beacon 320, the TBTT is $TBTT_{1,1,2} = TBTT_{1,1} + BCN\_OFST_{T2,Cov} + BCN\_OFST_{Cov,Cov}$. For beacon 322, the TBTT is $TBTT_{1,1,3} = TBTT_{1,1} + BCN\_OFST_{T2,Cov} + 2BCN\_OFST_{Cov,Cov}$. For beacon 324, the TBTT is $TBTT_{1,1,3} = TBTT_{1,1} + BCN\_OFST_{T2,Cov} + 3BCN\_OFST_{Cov,Cov}$. Thus, the beacons sent from the coverage APs in the multi-tier WLAN are sent at separate times and are not overlapped.

In the embodiment of FIG. 3, beacons sent from each coverage AP in the multi-tier WLAN are sent on separate channel numbers. Each of the beacons 318, 320, 322, and 324 are each sent on a channel number associated with the corresponding coverage AP, namely coverage APs 108, 124, 122, and 120. Thus, as shown in FIG. 1, coverage AP 11 108 is associated with a different frequency than coverage AP 12 124. Similarly each of the clients 104, 106 associated with coverage AP 11 108 are communicating on a different frequency than the clients associated with coverage AP 12 124.

It will be obvious to those skilled in the art that the beacon propagation schedule can include dummy TBTTs to enable future increase of the number of tier 2 APs or coverage APs in a cell with minimal efficiency loss. For example, a multi-tier WLAN similar to that shown in FIG. 1 without tier 2 AP 126 may have a beacon propagation schedule with time to send beacon 308 but such time is not necessary as tier 2 AP 126 does not exist in the multi-tier WLAN. If, however, tier 2 AP 126 is added to the multi-tier WLAN then the beacon propagation schedule could accommodate the change efficiently.

Figure 4:
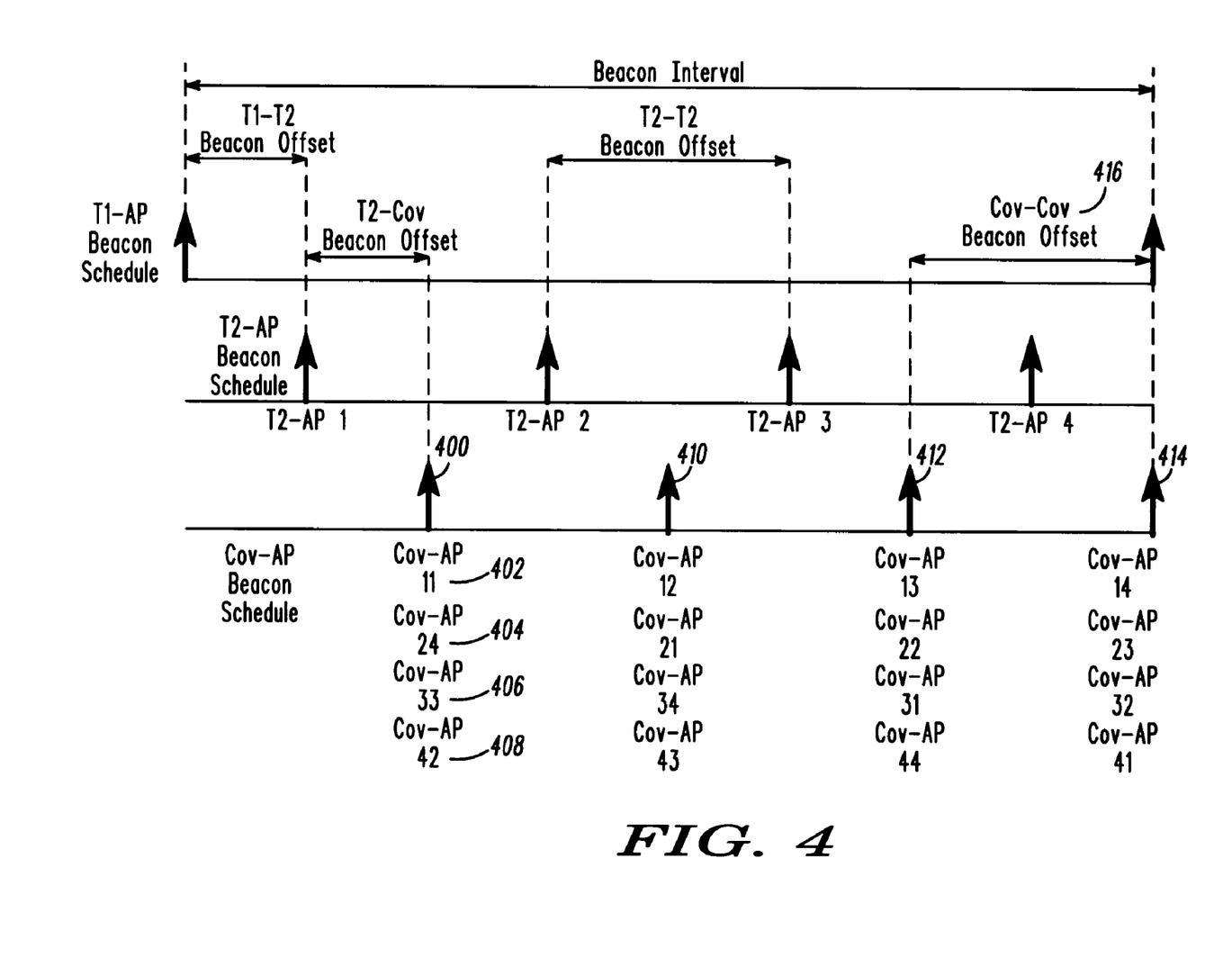
FIG. 4 is a timing diagram illustrating an alternative beacon propagation schedule in accordance with an embodiment of the invention.

In an alternate embodiment, as shown in FIG. 4, some beacons sent from some of the coverage APs in the multi-tier WLAN are overlapped. For example, beacons 402, 404, 406, and 408 are sent at one predetermined time and on channel numbers associated with the given coverage AP. For the architecture as shown in FIG. 1, there may be four predetermined times 400, 410, 412, 414 in which coverage APs can send their beacons. Having overlapped beacons from the coverage APs has the advantage that clients may not need to know a specific channel number to receive a beacon. A client knowing that it is time to receive a beacon from a coverage AP can scan to any channel in the multi-tier WLAN at the predetermined given time and will likely receive a beacon from a coverage AP. In such an embodiment where there are overlapping beacons, the $BCN\_OFST_{Cov,Cov}$ as described in Equation 2 may be set to be the time between two consecutive beacons sent by the same tier 2 AP divided by the number of coverage APs and is shown as time 416 in FIG. 3.

Returning to FIG. 2, intra-cell discovery is started by a client at a time when a beacon is expected from a coverage AP, e.g. $TBTT_{i,j,k}$, and ends after waiting a time delta where delta is a configurable parameter that accounts for delay in when the beacon is actually transmitted and the estimated duration of the beacon propagation period. In the worst case, delta is equal to the beacon interval, e.g. 326 in FIG. 3. The length of time that intra-cell discovery is performed needs to encompass both when a beacon is transmitted from a coverage AP, e.g. $TBTT_{i,j,k}$, and beacons transmitted from clients belonging to the coverage AP. Thus, the start time and the stop time need to encompass receiving both of these types of beacons.

During intra-cell discovery at the expected TBTT of a neighboring coverage AP, the client locks onto a channel number corresponding to the neighboring coverage AP and listens for beacons from the neighboring coverage AP and other clients in the neighboring BSS. During this scan, the client may also discover clients and coverage APs belonging to other BSSs if there are overlapping beacon transmission times and beacon propagation periods.

Further, each coverage AP is associated with one channel and the clients associated with the coverage AP are associated with the same channel. Thus, in the architecture of FIG. 1, coverage AP 11 108 is associated with one channel, coverage AP 12 124 is associated with a second channel, coverage AP 13 122 is associated with a third channel, and coverage AP 14 120 is associated with a fourth channel. This pattern is repeated over coverage APs belonging to different tier 2 APs. Therefore, calculating the channel number of a coverage AP is shown in FIG. 2 Block 212 and as below.

$$Ch\_num = (\text{Serving Cov-AP Ch\_num} + n) \bmod (\text{Total\_num\_channels}) \quad (3)$$

where chan_num=0, 1, 2, ..., (Total_num_channels−1);
n=1, 2, 3, ..., Total_nim_Cover-APs/cell.

Further, a client can learn the channel number of all the coverage APs within a cell with respect to its own serving AP's channel number. In addition, the client can map a given estimated TBTT of a coverage AP to its channel number, both by using its serving coverage AP's TBTT and channel number as a reference. For example, if the serving coverage AP's channel number is 2 and its TBTT is TBTT2, then the client can expect a second coverage AP in the cell to transmit a beacon at $TBTT2 + 1*BCN\_OFST_{Cov,Cov}$ on channel number 3, a third coverage AP to transmit a beacon at TBTT2+2*BCN_OFST$_{Cov,Cov}$ on channel number 0, a fourth coverage AP to transmit a beacon at TBTT2+3*BCN_OFST$_{Cov,Cov}$ on channel number 1, a fifth coverage AP to transmit a beacon at TBTT2+4*BCN_OFST$_{Cov,Cov}$ on channel number 2 and so on. Thus, during intra-cell discovery, a client in the cell needs to scan each of the four channels during the time for performing intra-cell discovery. Note that it is obvious to one of ordinary skill in the art that the above scheme can be easily extended to include multi-tier WLANs where the total number of channels and/or coverage APs per tier 2 AP is greater than or less than four. Also, the channel numbering is used only to indicate a given order of channel allocation with respect to the beacon transmission order. In other words, channel number 0 may not necessarily be less than channel number 1, 2, or 3 and channel numbers 0, 1, 2 and 3, when physically translated to a channel may not be in strictly ascending or descending order.

As mentioned previously, in the alternate embodiment of FIG. 4, the beacons are transmitted in an overlapped manner, such that there are fewer options for estimated TBTTs. Further, at each such time, beacons are transmitted in all of the four channel numbers by the coverage APs. For example, beacon 402 is transmitted at channel number 1, beacon 404 is transmitted at channel number 2, beacon 406 is transmitted at channel number 3 and beacon 408 is transmitted at channel number 0. Therefore, a client performing intra-cell discovery according to the beacon propagation schedule of FIG. 4 need not know the channel ordering but the client will need to be able to estimate the TBTT options. Again, as mentioned above, it is obvious to one of ordinary skill in the art, that this scheme can also be easily extended to include multi-tier WLANs with fewer or more than four channels.

In an embodiment of the present invention, scanning each of the four channels may be performed in any order. For example, a client may scan channels three and four at corresponding estimated TBTTs, and then return to channels one and two. In addition, performing scanning may be interleaved with handling traffic of the multi-tier WLAN where traffic is defined as handling the communications between clients of the multi-tier WLAN. Thus, a client of the cell may scan a channel and then handle traffic before returning to the function of scanning. Further, if the function of scanning each of the four channels is not performed within one beacon interval (e.g. 326 in FIG. 3), then a subsequent beacon interval is utilized to continue the function of scanning.

In an embodiment of the present invention, performing intra-cell discovery is advantageous because it reveals neighboring clients and coverage APs by using known beacon offsets and channel number ordering. A client performing intra-cell discovery does not have to spend much time finding the correct channel to scan and does not have to determine a time when a beacon is expected. Both of these pieces of information are available to the client with respect to the TBTT and channel number of the serving coverage AP. In other words, the serving coverage AP acts as a reference point for intra-cell discovery. Thus, a client is able to find its neighbors quickly and is thereby able to save power. Further, since passive scanning is utilized, the client does not cause unnecessary collisions in the multi-tier WLAN.

Returning to FIG. 2, inter-cell discovery is performed when a client does not have knowledge of when to expect beacons and thus does not have knowledge of a reference coverage AP in a neighboring cell. Inter-cell discovery is performed by first choosing a channel number to scan (Block 222) where the channel number is chosen by the client having knowledge of the channels available for the multi-tier WLAN, for example by referring to a preprogrammed scan list of available channels and iterating through the list. Once a channel is chosen, the client performs either active scanning by sending out a probe request packet and waiting for a probe response packet on the chosen channel or by performing passive scanning by listening for beacons on the chosen channel (Block 220). If no probe response packet is received or no beacons are heard (Block 216), then the client scans the next channel in its preprogrammed list (Block 218) and performing the function of scanning again (Block 220).

If a probe response packet is received via active scanning or a beacon is found via passive scanning, a reference coverage AP has been determined and the process of inter-cell discovery continues as in Block 224. Once a reference coverage AP has been determined, the function of scanning proceeds similar to how intra-cell discovery functions. Thus, Blocks 224 and Blocks 212 are similar only that Block 224 is with respect to a reference coverage AP, whereas, Block 212 uses the serving coverage AP as reference point. Further, since a new coverage AP has been found, the client's neighbor list is updated to include information relating to the new coverage AP. Since a reference coverage AP is found, subsequent scans are performed as in Block 212 and the client does not need to continue conventional active or passive scanning as in Block 220. Thus, the process of inter-cell discovery has been optimized so that when a client needs to perform inter-cell discovery again, a reference coverage AP has already been found for that cell.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language).

We claim:

1. A method for performing neighbor discovery in a multi-tier wireless local area network comprising, at a mobile client in the multi-tier wireless local area network:

creating a neighbor list identifying one or more neighbors of the mobile client in the multi-tier wireless local area network, wherein each of the neighbors is identified as a fixed access point or a neighboring mobile client, wherein creating the neighbor list comprises:
determining a time to perform a scan of neighbors based upon 1) a type of multi-tier neighbor discovery to be performed and 2) when a first beacon is transmitted by a fixed access point in a first tier of the multi-tier wireless local area network, performing a scan of neighbors at the determined time on at least one channel associated with the type of multi-tier neighbor discovery, receiving a beacon on the at least one channel during the scan, wherein the beacon is sent from a neighbor of the mobile client, and populating the neighbor list with information transmitted in the beacon, wherein at least one of:

the beacon received on the at least one channel is transmitted at a frequency which is variable and based upon a number of hops to a fixed serving coverage access point, a number of mobile clients supported, and a frequency of beacons sent by fixed access points in the multi-tier wireless local area network, if the type of multi-tier neighbor discovery is intra-cell, then the determined time is based upon when the fixed serving coverage access point sends a beacon where the beacon sent by the fixed serving coverage access point is based upon a time a previous tier fixed access point sends its beacon, and the scan of neighbors is performed on a first channel during a beacon interval encompassing beacons sent by a tier 1 fixed access point, or if the type of discovery is inter-cell and a fixed reference access point in a neighboring cell has been found, then the determined time is based upon when the fixed reference access point sends a beacon where the beacon sent by the fixed reference access point is based upon a time a previous tier fixed access point sends its beacon, and the scan of neighbors is performed on a third channel associated with the neighboring cell of the wireless local area network during a beacon interval encompassing beacons sent by a tier 1 fixed access point.

2. The method of claim 1 wherein the determined time is further based upon 3) when a second beacon is transmitted by a fixed access point in a second tier of the multi-tier wireless local area network.

3. The method of claim 1 wherein the determined time is further based upon 4) when a third beacon is transmitted by a fixed coverage access point in a third tier of the multi-tier wireless local area network.

4. The method of claim 3 wherein the third beacon further comprises information indicating a beacon propagation period for mobile clients associated with the fixed coverage access point.

5. The method of claim 4 wherein the beacon propagation period is a protected time.

6. The method of claim 3 wherein the third beacon is transmitted at an offset from when a previous tier fixed access point has transmitted its beacon.

7. The method of claim 1 wherein the multi-tier wireless local network comprises at least one tier of fixed access points and at least one tier of mobile clients.

8. The method of claim 7 wherein the at least one tier of fixed access points further comprises fixed coverage access points providing coverage to the at least one tier of mobile clients of the multi-tier wireless local area network.

9. The method of claim 1 wherein if the type of multi-tier neighbor discovery is intra-basic service set, then the scan is performed on a channel associated with a basic service set during a beacon propagation period.

10. The method of claim 1 wherein the first channel is established based upon a second channel associated with the fixed serving coverage access point.

11. The method of claim 1 wherein if the type of multi-tier neighbor discovery is inter-cell, then the determined time is based upon finding a fixed reference coverage access point and the scan of neighbors is performed on a channel associated with the found fixed reference coverage access point.

12. The method of claim 11 wherein the step of finding a fixed reference coverage access point is performed by a passive scan methodology.

13. The method of claim 11 wherein the fixed reference coverage access point is in a neighboring cell.

14. The method of claim 1 wherein the step of determining when to perform a scan of neighbors is based upon criteria comprising a signal strength from the fixed access point, the mobile client's current location, a time that a scanning of neighbors was last performed, and the mobile client's velocity and direction of motion.

15. The method of claim 1 wherein the third channel is established based upon a fourth channel associated with the fixed reference access point.

16. The method of claim 1 wherein the determined time is further based upon 5) when a signal strength to a fixed serving coverage access point of the mobile client is below a threshold.

17. The method of claim 1 wherein the step of determining further comprises performing the scan at preset intervals.

18. The method of claim 1, wherein the type of multi-tier neighbor discovery comprises one of an intra-basic service set (BSS), intra-cell, or inter-cell discovery.

19. A method for performing neighbor discovery in a single cell of a multi-tier wireless local area network comprising, at a mobile client in the single cell of the multi-tier wireless local area network:

creating a neighbor list identifying one or more neighbors of the mobile client in the single cell of the multi-tier wireless local area network, wherein each of the neighbors is identified as a fixed access point or a neighboring mobile client, wherein creating the neighbor list comprises:

receiving a first beacon from a first fixed coverage access point that identifies a first beacon propagation period for mobile clients associated with the first fixed coverage access point, determining a time when a second beacon is transmitted based upon the received first beacon wherein the second beacon identifies a second beacon propagation period for mobile clients associated with a second fixed coverage access point, performing a scan of neighbors on a channel of the multi-tier wireless local area network at the second beacon propagation period to find a third beacon from at least one neighbor mobile client in the cell, and populating the neighbor list with the at least one neighbor mobile client in the cell.

20. The method of claim 19 wherein the channel is established based upon a first channel associated with the first fixed coverage access point.

21. The method of claim 19 wherein the first beacon propagation period is a protected time.

22. The method of claim 19 wherein the third beacon is transmitted at a frequency which is variable and is based upon a number of hops to the fixed serving coverage access point, a number of mobile clients supported, and a frequency of beacons sent by fixed access points in the multi-tier wireless local area network.

23. The method of claim 19 wherein the first beacon is transmitted at an offset from when a previous tier fixed access point has transmitted its beacon.

24. The method of claim 19 wherein the first beacon is transmitted during a beacon interval encompassing beacons sent by a tier 1 fixed access point.

25. The method of claim 19 wherein the multi-tier wireless local network comprises at least one tier of fixed access points and at least one tier of mobile clients.

26. The method of claim 19 wherein the first beacon propagation period is a pre-designated time corresponding to a controlled access period.

27. A method for performing neighbor discovery in a basic service set of a multi-tier wireless local area network comprising, at a mobile client in the basic service set of the multi-tier wireless local area network:

creating a neighbor list identifying one or more neighbors of the mobile client in the basic service set of the multi-tier wireless local area network, wherein each of the neighbors is identified as a fixed access point or a neighboring mobile client, wherein creating the neighbor list comprises:

receiving a beacon from a fixed serving coverage access point that identifies a beacon propagation period for the neighbor mobile clients in the basic service set, performing a scan of neighbors on a channel associated with the fixed serving coverage access point during the beacon propagation period to find at least one neighbor mobile client in the basic service set, and populating the neighbor list with the at least one neighbor mobile client, wherein the beacon received on the channel is transmitted at a frequency which is variable and based upon a number of hops to the fixed serving coverage access point, a number of mobile clients supported, and a frequency of beacons sent by fixed access points in the multi-tier wireless local area network.

* * * * *

UNITED STATES PATENT AND TRADEMARK OFFICE
CERTIFICATE OF CORRECTION

PATENT NO. : 7,706,337 B2
APPLICATION NO. : 10/970940
DATED : April 27, 2010
INVENTOR(S) : Pandey et al.

It is certified that error appears in the above-identified patent and that said Letters Patent is hereby corrected as shown below:

In Column 6, Line 50, delete "$BCN\_OFST_{T1,T2}$" and insert -- $BCN\_OFST_{T2,T2}$ --, therefor.

In Column 6, Line 53, delete "$BCN\_OFST_{T1,T2}$," and insert -- $BCN\_OFST_{T2,T2}$, --, therefor.

In Column 6, Line 55, delete "$BCN\_OFST_{T1,T2}$" and insert -- $BCN\_OFST_{T2,T2}$ --, therefor.

Signed and Sealed this
Seventeenth Day of July, 2012

David J. Kappos
*Director of the United States Patent and Trademark Office*